United States Patent
Kyeong et al.

(10) Patent No.: US 7,095,814 B2
(45) Date of Patent: Aug. 22, 2006

(54) APPARATUS AND METHOD FOR VERY HIGH PERFORMANCE SPACE-TIME ARRAY RECEPTION PROCESSING USING CHIP-LEVEL BEAMFORMING AND FADING RATE ADAPTATION

(75) Inventors: Mun Geon Kyeong, Taejon (KR); Jae Joon Park, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 889 days.

(21) Appl. No.: 09/973,895

(22) Filed: Oct. 11, 2001

(65) Prior Publication Data

US 2002/0054621 A1 May 9, 2002

(30) Foreign Application Priority Data

| Oct. 11, 2000 | (KR) | ................................. 2000-59803 |
| Oct. 25, 2000 | (KR) | ................................. 2000-62843 |
| Nov. 21, 2000 | (KR) | ................................. 2000-69229 |

(51) Int. Cl.
*H04B 7/00* (2006.01)
*H04B 1/707* (2006.01)

(52) U.S. Cl. ....................................... 375/347; 375/148
(58) Field of Classification Search ................ 375/144, 375/148, 267, 299, 347, 349, 150
See application file for complete search history.

(56) References Cited

U.S. PATENT DOCUMENTS

| 6,115,409 A * | 9/2000 | Upadhyay et al. ............ 375/144 |
| 6,134,262 A | 10/2000 | Kitade et al. |
| 6,249,251 B1 * | 6/2001 | Chang et al. ................. 342/378 |
| 6,304,750 B1 * | 10/2001 | Rashid-Farrokhi et al. . 455/137 |
| 6,598,014 B1 * | 7/2003 | Rabideau et al. ............ 702/194 |
| 6,836,507 B1 * | 12/2004 | Gifford et al. ............... 375/150 |

FOREIGN PATENT DOCUMENTS

| KR | 1998-35858 | 7/1997 |
| KR | 1998-701743 | 6/1998 |

OTHER PUBLICATIONS

Richard Bamler; Doppler Frequency Estimation and the Cramér-Rao Bound; IEEE Transactions on Geoscience and Remote Sensing, vol. 29, No. 3, May 1191, pp. 385-390.

(Continued)

*Primary Examiner*—Kevin Kim
(74) *Attorney, Agent, or Firm*—Mayer, Brown, Rowe and Maw LLP

(57) ABSTRACT

An apparatus for very high performance space-time array reception processing using chip-level beamforming and fading rate adaptation is disclosed. The space-time array receiving system includes a plurality of digital beamforming networks for forming beams of signals by spatial-filtering the signals, to thereby generate spatial-filtered signals; a plurality of demodulating unit for demodulating the spatial-filtered signals to generate demodulated signals; correlating unit for estimating a fading channel signal based on pilot channel signals; Doppler frequency estimating unit for estimating Doppler frequency of the fading channel signal to generate Doppler frequency estimated values; correlation length selection unit for selecting a correlation length of the pilot channel signals based on the Doppler frequency estimated values; a plurality of reference signal generation unit for generating reference signals based on output signals from the correlating unit; and a plurality of weight vector estimating unit for generating weight vectors based on the reference signals and the signals and for providing the weight vector to the digital beamforming networks.

33 Claims, 13 Drawing Sheets

OTHER PUBLICATIONS

Crestel, et al.; A *Doppler Frequency Estimate Using the Instantaneous Frequency;* 1997 IEEE, DSP 97, pp. 777-780.

Ralph T. Compton, Jr.; *An Adaptive Array in a spread-Spectrum Communication System;* 1978 IEEE; vol. 66, No. 3, Mar. 1978, pp. 289-298.

* cited by examiner

APPARATUS AND METHOD FOR VERY HIGH PERFORMANCE SPACE-TIME ARRAY RECEPTION PROCESSING USING CHIP-LEVEL BEAMFORMING AND FADING RATE ADAPTATION

FIELD OF THE INVENTION

The present invention relates to a code division multiple access (CDMA) wireless communication system; and, more particularly, to a method and apparatus for chip-level and temporal reference beamforming in a space-time array reception system of a CDMA wireless communication system which estimates Doppler frequency of a fading channel and adaptively compensates distortion effect caused by the fading channel in the space-time array reception system of the CDMA wireless communication system.

DESCRIPTION OF THE PRIOR ART

A plurality of users are able to use the same frequency bandwidth at the same time in a code division multiple access (CDMA) wireless communication system, wherein the users are distinguished from one another by being assigned with their own code. There are intracell interference and intercell interference that occur in the CDMA wireless communication system. Intracell interference is generated by signals from other users in the same cell and the intercell interference, by signals from users in a different cell. Capacity of the CDMA wireless communication system is restricted by the quantity of those interferences.

There is provided a method reducing those interferences to increase system capacity. A 3-sector antenna is employed in a conventional commercial system such as IS-95 for it. To employ the 3-sector antenna, one cell is divided into three sectors and each sector is assigned with a corresponding sector antenna, which transmits and receives transmission/reception signals of a corresponding sector. In case that the distribution of users is uniform, the 3-sector antenna is so ideal to employ that the quantity of interference can be reduced to a third as much as there used to be. The 3-sector antenna has allowed a system of low data rate such as a digital cellular system or a personal communication service (PCS) system to maintain efficient system capacity. However, the sector antenna is not proper to maintain enough system capacity needed for system operation in a system of high data rate such an international mobile telecommunication-2000 (IMT-2000) system. Subsequently, demanded is a new method for increasing system capacity greatly and as one solution for it, an adaptive array antenna system gets in the highlight. The adaptive array antenna system maximizes the efficiency of the transmission/reception by keeping a beam pattern of an antenna directed to a user in service using a series of array antennas. Omnidirectional antenna receives signals from all users simultaneously. But the adaptive array antenna system using linear array antenna receives user signals as much as possible by beamforming in a direction a user wants at the same time reduces the amount of interference by suppressing signals from other users. Therefore, applying the adaptive beamforming method to a base station by using an array antenna not only reduces unnecessary interference by transmitting/receiving frequencies directionally according to the spatial distribution of users, but also increases electric efficiency, which eventually leads to the improvement of communication quality and the increase in the service coverage of a base station and the user capacity.

The adaptive beamforming algorithms such as MMSE (Minimum Mean Square Error), LMS (Least Mean Square), and RLS (recursive Least Square), which are applied to the adaptive array antenna system, need reference signal during the adaptive optimizing procedures. Commonly, a reference signal means a signal including a complete information or knowledge on the signal of interest. The reference signal can be divided into a space reference signal and a time reference signal. The space reference signal stands for the arrival angle of a signal a user wants, and the time reference signal can be pilot signals or spread codes used in a CDMA transmission terminal. Because spread codes are accurately acknowledged in a CDMA wireless communication system, the adaptive beamforming using a temporal reference signal can be applied very well. Generally, the adaptive beamforming in a CDMA wireless communication system is embodied by using a reference signal generation loop model suggested by Ralph T. Compton (Ralph T. Compton, Jr., Adaptive Array in a Spread Spectrum Communication System, Proc. of the IEEE, Vol. 66, No. 3, pp. 289–298, March 1978).

In general, beams are formed in two methods according to the position to which weight vector is multiplied: one is a chip-level beamforming technique and the other is a symbol-level beamforming technique. The chip-level beamforming method multiplies the weight vector to the chip-based signal before de-spreading, while the symbol-level beamforming method multiplies the weight vector to the symbol-based signal after de-spreading (See FIGS. 1 and 2). Studies have been done on the symbol-level beamforming method so far, but as this technique cannot be applied to conventional CDMA demodulators independently, a new hardware combining a demodulator and a beamforming device needs to be designed. On the contrary, the chip-level beamforming method can be applied to the conventional demodulators independently so it does not need an additional hardware.

In general, compared to the symbol-level beamforming method, the chip-level beamforming method needs less number of I/Q correlators, thus making the hardware size small. Also, unlike the symbol-level beamforming method, it maintains conceptual consistency because all the decoding procedures after beamforming are the same as those of conventional demodulators. To the contrary, this method has shortcomings of huge electric consumption because it multiplies the weight vector to the chip-based signal and requires SF(Spreading Factor)-fold high speed operations, i.e., multiplication and addition, and of large amount of calculation for estimating the weight vector. However, in case of the increasing number of antennas and high-speed data (SF=8), the number of I/Q correlators required for the symbol-level beamforming method increases and the number of gates consumed therein increase. Therefore, the electric power is consumed more than in the chip-level beamforming method. Also, electric consumption is not a matter of concern in a base station system in general, the present invention suggests a structure and method for reducing the size of hardwares needed for the embodiment of an actual system by applying the chip-level beamforming method and the number of additional hardwares that changes the structure of a demodulator by making it possible to embody the beamforming independently from a conventional demodulator.

Besides the position to which weight vector is multiplied, the procedures of generating reference signals needed for estimating the weight vector can be divided into two methods: one is a generation method with chip-level signals, the other is a method generating them with symbol-level signals. The present invention suggests a model that is applicable to a conventional CDMA mobile communication system and can be incorporated to the chip-level beamforming method based on the reference signal generation model of Ralph T. Compton. Meanwhile, in case there is a pilot channel signal, a model adding the pilot symbol sequence to the reference signal generation method is included.

Generally, signals transmitted from a base station are distorted while going through a fading channel and then received at a terminal. To compensate the distort phenomenon, the IS-95 CDMA system of Qualcomm has non-modulated pilot channel in the forward link, i.e., a link from a base station to the mobile station, and compensates the distortion phenomenon caused by the fading channel. This is using the fading channel information obtained by correlating the received pilot channel with the local PN (Pseudo Noise) code for a predetermined period to compensate the distortion by the fading channel at the terminal (Qualcomm Incorporated, Mobile Demodulator Architecture for A Spread Spectrum Multiple Access Communication System, U.S. Pat. No. 5,764,687, June 19980). In "Spread Spectrum Reception Apparatus" (EP 0 822 668 A2, KR98-12990), a method of estimating Doppler frequency of received signals in the forward link of a common CDMA system and estimating the channel by controlling the pilot channel correlation length according to it has been suggested.

However, above methods are all based on the compensation for the fading channel in the forward link. The present invention takes trait in estimating the channel adaptively by estimating Doppler frequency of received signals in the reverse link, i.e., a link from a mobile station to a base station, in the base station system using an array antenna. Also, this invention takes another trait in estimating the Doppler frequency by using the instant frequency difference of received signals unlike the skill of estimating Doppler frequency employed in the prior patents. In the conventional base station system, the channel is estimated by correlating a pilot channel for a predetermined period to compensate the distortion of the channel, regardless of the amount of fading channel change to the moving speed of a terminal. More accurate channel can be estimated by choosing short correlation length of a pilot channel in a fast fading environment caused by the high-speed movement of a terminal, and choosing a long correlation length of a pilot channel in a low-speed fading environment caused by the slow movement of a terminal. Modifying the method suggested by Qualcomm and prior patents, the present invention tries to show a method estimating channel information more accurately by selecting the correlation length of a pilot channel adaptively to the amount of fading channel change.

SUMMARY OF THE INVENTION

It is, therefore, an object of the present invention to provide an apparatus and method for effective chip-level beamforming using an array antenna for the increase in the service coverage and the capacity of a conventional CDMA system while using the demodulator structure of a conventional system in the reverse link of a CDMA wireless communication system as it is without modification.

It is another object of the present invention to provide a decision-directed method using traffic channel information by the output of a rake combiner feedbacking the hard-decided symbol to obtain an effective chip-level beamforming weight vector, the method being able to reduce the number of hardwares that changes the structure of a demodulator because beamforming method can be embodied independently from a demodulator of a conventional system.

It is still another object of the present invention to provide a structure for processing data in real-time to solve the difficulty of processing them in real-time in updating weight vector due to heavy amount of calculation by using part of the received data; and a method for choosing the correlation length by using the amount of fading channel change obtained from the estimation of Doppler frequency, not relating received pilot channel for a predetermined period when relating it to the local PN code in order to compensate the distort phenomenon by the fading channel in the reverse link of the CDMA wireless communication system employing an array antenna.

In accordance with one aspect of the present invention, there is provided A space-time array receiving system to which a chip-level temporal reference beamforming algorithm is applied, the system including: a plurality of digital beamforming networks for forming beams of signals received through a plurality of antennas by spatial-filtering the signals, to thereby generate spatial-filtered signals; a plurality of demodulating unit for demodulating the spatial-filtered signals to generate demodulated signals; correlating unit located in the demodulator, for estimating a fading channel signal based on pilot channel signals; Doppler frequency estimating unit for estimating Doppler frequency of the fading channel signal to generate Doppler frequency estimated values; correlation length selection unit for selecting a correlation length of the pilot channel signals based on the Doppler frequency estimated values; and a plurality of reference signal generation unit for generating reference signals based on output signals from the correlating unit; a plurality of weight vector estimating unit for generating weight vectors based on the reference signals and the signals and for providing the weight vector to the digital beamforming networks.

In accordance with another aspect of the present invention, there is provided a space-time array receiving system to which a chip-level temporal reference beamforming algorithm is applied, the system including: a plurality of digital beamforming networks for forming beams of signals received through a plurality of antennas by spatial-filtering the signals, to thereby generate spatial-filtered signals; a plurality of demodulating unit for demodulating the spatial-filtered signals to generate demodulated signals; correlating unit located in the demodulator, for estimating a fading channel signal based on pilot channel signals; Doppler frequency estimating unit for estimating Doppler frequency of the fading channel signal to generate Doppler frequency estimated values; correlation length selection unit for selecting a correlation length of the pilot channel signals based on the Doppler frequency estimated values; a rake combining unit for combining symbols from the correlating unit to thereby generate a rake combined signal; a hard limiter for determining a signature of the rake combined symbol; a plurality of reference signal generation unit for generating reference signals based on output signals from the correlating unit and the hard limiter; and a plurality of weight vector estimating unit for generating weight vectors based on the reference signals and the signals and for providing the weight vector to the digital beamforming networks.

In accordance with further another aspect of the present invention, there is provided a space-time array receiving system to which a chip-level temporal reference beamforming algorithm is applied, the system including: a plurality of digital beamforming networks for forming beams of signals received through a plurality of antennas by spatial-filtering the signals, to thereby generate spatial-filtered signals; a plurality of demodulating unit for demodulating the spatial-filtered signals to generate demodulated signals; correlating unit located in the demodulator, for estimating a fading channel signal based on pilot channel signals; Doppler frequency estimating unit for estimating Doppler frequency of the fading channel signal to generate Doppler frequency estimated values; correlation length selection unit for selecting a correlation length of the pilot channel signals based on the Doppler frequency estimated values; a plurality of reference signal generation unit for generating reference signals based on output signals from the correlating unit; a plurality of subtracters for generating difference signals between the spatial-filtered signals and the reference signals; and a plurality of weight vector estimating unit for estimating weight vectors based on the difference signals and the signals, and providing the weight vectors to the digital beamforming networks.

In accordance with further another aspect of the present invention, there is provided a space-time array receiving system to which a chip-level temporal reference beamforming algorithm is applied, the system including: a plurality of digital beamforming networks for forming beams of signals received through a plurality of antennas by spatial-filtering the signals, to thereby generate spatial-filtered signals; a plurality of demodulating unit for demodulating the spatial-filtered signals to generate demodulated signals; correlating unit located in the demodulator, for estimating a fading channel signal based on pilot channel signals; Doppler frequency estimating unit for estimating Doppler frequency of the fading channel signal to generate Doppler frequency estimated values; correlation length selection unit for selecting a correlation length of the pilot channel signals based on the Doppler frequency estimated values; a rake combining unit for combining symbols from the correlating unit to thereby generate a rake combined signal; a hard limiter for determining a signature of the rake combined symbol; a plurality of reference signal generation unit for generating reference signals based on output signals from the correlating unit and the hard limiter; a plurality of subtracters for generating difference signal between the spatial-filtered signals and the reference signals; and a plurality of weight vector estimating unit for estimating weight vectors based on the difference signals and the signals, and providing the weight vectors to the digital beamforming networks.

In accordance with still further another aspect of the present invention, there is provided a space-time array receiving method to which a chip-level temporal reference beamforming algorithm is applied, the method comprising the steps of: a) at a plurality of digital beamforming networks, forming beams of signals received through a plurality of antennas by spatial-filtering the signals, to thereby generate spatial-filtered signals; b) demodulating the spatial-filtered signals to generate demodulated signals; c) estimating a fading channel signal based on pilot channel signals; d) estimating Doppler frequency of the fading channel signal to generate Doppler frequency estimated values; e) selecting a correlation length of the pilot channel signals based on the Doppler frequency estimated values; and f) generating reference signals based on output signals from the correlating means; and g) generating weight vectors based on the reference signals and the signals, and providing the weight vector to the digital beamforming networks.

In accordance with further another aspect of the present invention, there is provided a computer readable recording medium storing instructions for executing a space-time array receiving method to which a chip-level temporal reference beamforming algorithm is applied, the method comprising the steps of: a) at a plurality of digital beamforming networks, forming beams of signals received through a plurality of antennas by spatial-filtering the signals, to thereby generate spatial-filtered signals; b) demodulating the spatial-filtered signals to generate demodulated signals; c) estimating a fading channel signal based on pilot channel signals; d) estimating Doppler frequency of the fading channel signal to generate Doppler frequency estimated values; e) selecting a correlation length of the pilot channel signals based on the Doppler frequency estimated values; and f) generating reference signals based on output signals from the correlating means; and g) generating weight vectors based on the reference signals and the signals, and providing the weight vector to the digital beamforming networks.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Hereinafter, preferred embodiments in accordance with the present invention will be described in detail referring to the accompanying drawings.

Figure 1:
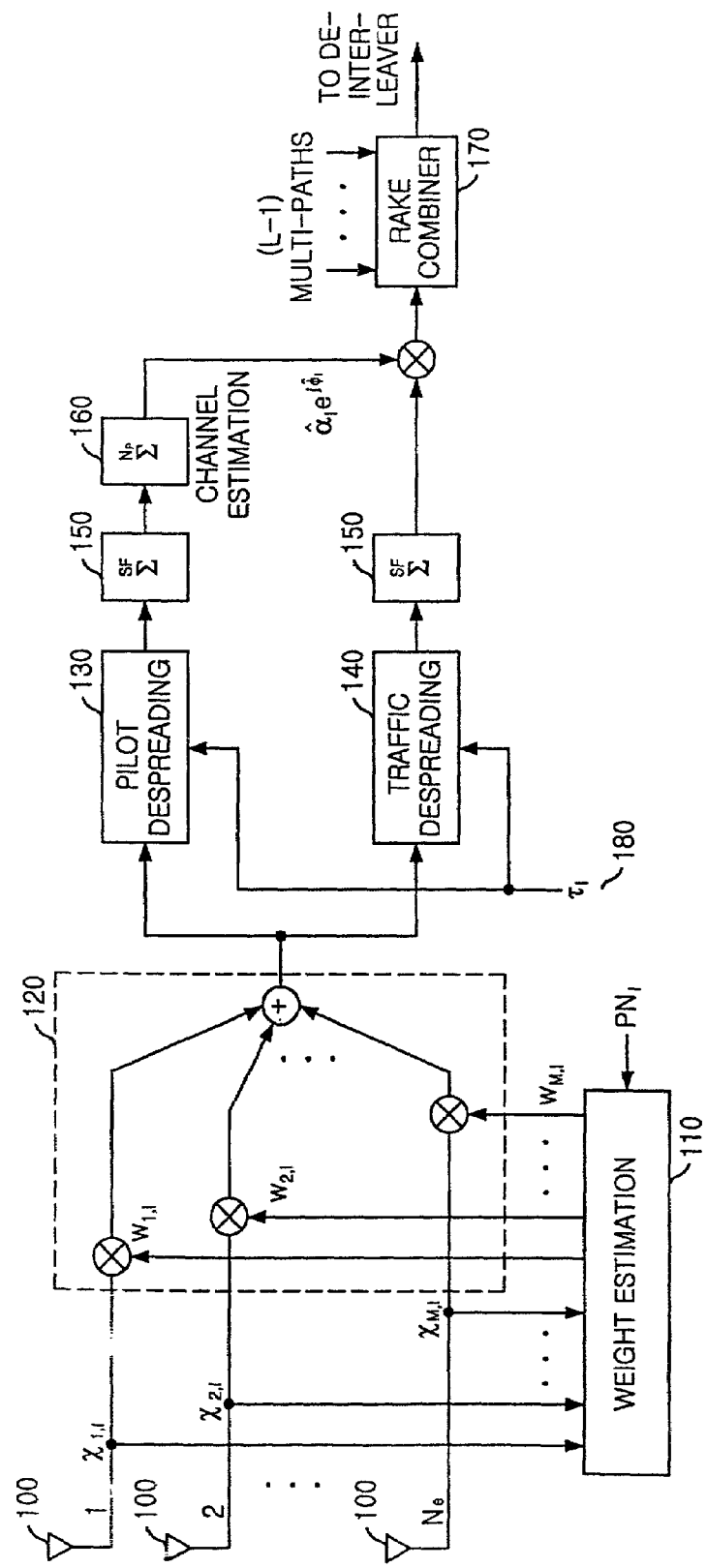
FIG. 1 shows an embodiment of a demodulator employing the chip-level beamforming method in a CDMA adaptive array antenna system.

FIG. 1 shows an embodiment of a demodulator employing the chip-level beamforming method in a CDMA adaptive array antenna system, in which the beamforming weight vector is multiplied to the chip-level input bandwidth spread signal. The signal transmitted from a base station in a cell is received at an array antenna with $N_e$ number of array antenna elements 100 in a base station, down-converted into the frequency of a base-band signal, becomes a signal of sampled and quantized digital base-band signal and becomes an input signal into a chip-level beamforming demodulator. This base-band signal is multiplied to the weight vector obtained by a snapshot signal received before at the digital beamforming network 120 as soon as inputted into the weight vector estimator 110, and then joined in a signal row.

Each signal of a path is despread based on the finely controlled path delay information 180, and those signals are combined at a rake combiner 170. The combined signals are restored while going through the de-interleaver, channel demodulator and data restorer. Pilot channel data and traffic channel data are despread at a pilot channel correlator 130 and a traffic channel correlator 140, respectively, and used for channel estimation 160 and data demodulation.

Equipping less number of I/Q correlators than the symbol-level beamforming method, the chip-level beamforming method has an advantage of a small hardware. Unlike the symbol-level beamforming method, it maintains conceptual consistency because all the demodulation procedures after beamforming are the same as those of a conventional demodulator. On the other hand, there is required a high speed calculation operation for addition and multiplication a spreading factor (SF) times faster than in the symbol-level beamforming technique in multiplying chip-based signals by weight vector. Accordingly, there are shortcomings that the power dissipation increases and the calculation quantity for estimation of the weight vector also increases. However, if the number of antennas increases and data are of high data rate where, for example, SF=8, total dissipated power is larger in the symbol-level beamforming technique than in the chip-level beamforming technique because in case of the chip-level beamforming technique, the number of necessary gates increases due to the rapid increase in the number of I/Q correlators. Since the power consumption is generally a small matter in a base station system, the size of hardware necessary for system embodiment can be small by employing the chip-level beamforming technique and also, the technique can be performed independently from a conventional demodulator.

Figure 2:
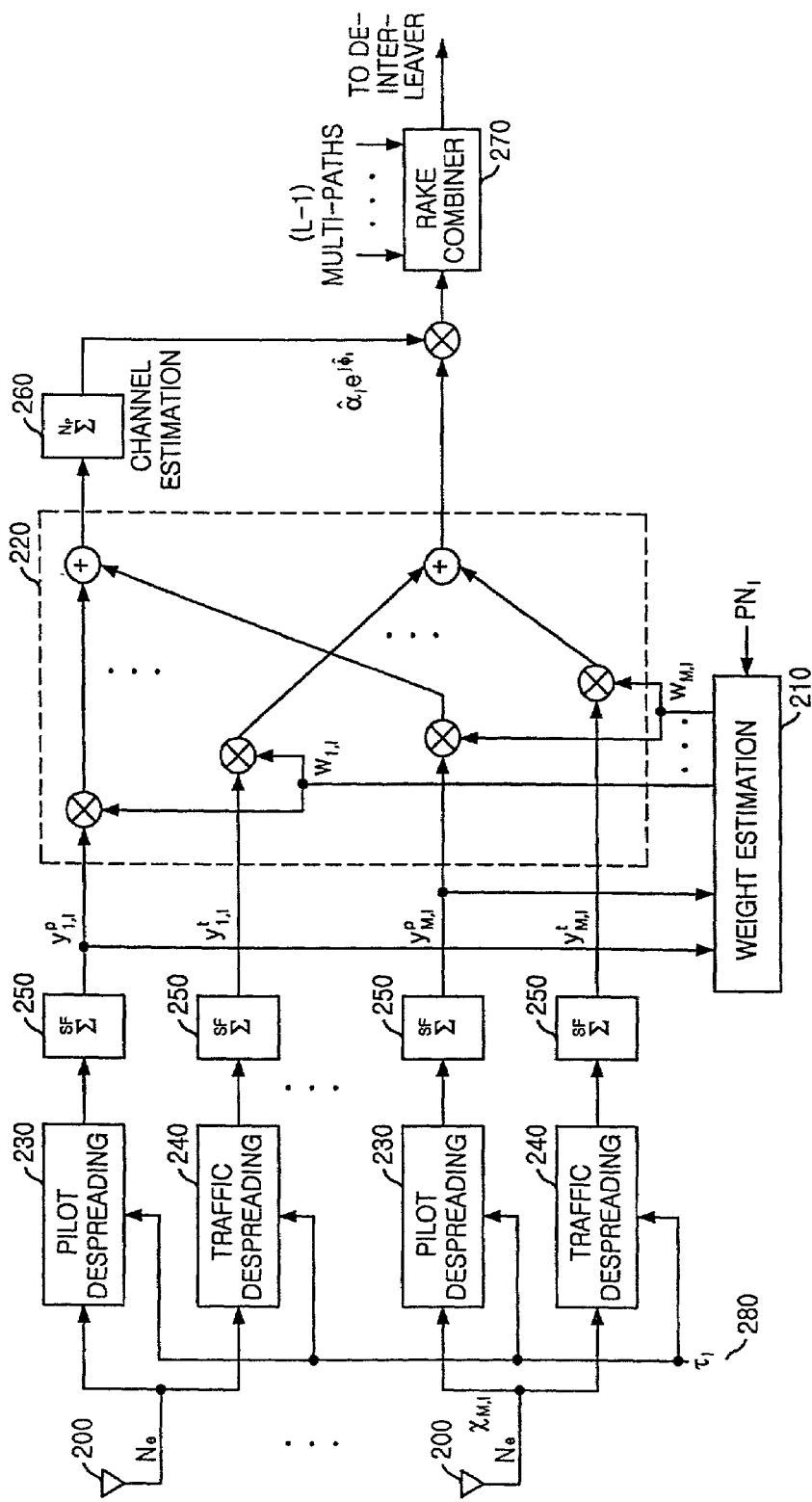
FIG. 2 depicts an embodiment of a demodulator employing the symbol-level beamforming method in a CDMA adaptive array antenna system.

FIG. 2 depicts an embodiment of a demodulator employing the symbol-level beamforming method in a CDMA adaptive array antenna system, in which the weight vector is multiplied to the symbol-level despread signal unlike FIG. 1. This embodiment shows a shortcoming of complicacy in hardware with increased number of I/Q correlators, compared with the demodulator adopting the chip-level beamforming method of FIG. 1.

Figure 3:
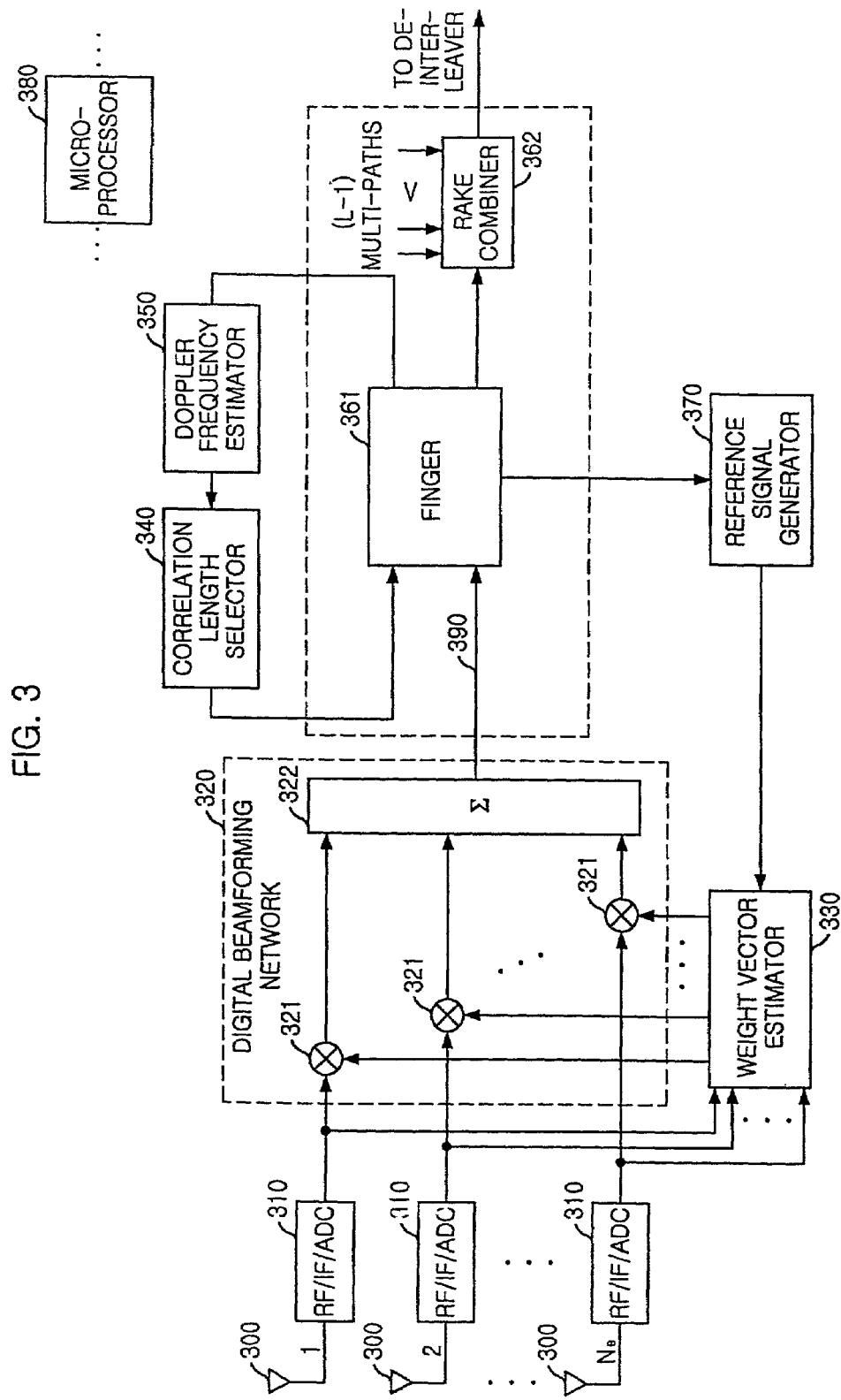
FIG. 3 illustrates a detailed block diagram of a space-time array reception system applied with a systolic array structure for computing the chip-level beamforming weight vector in real-time for a certain channel in accordance with an embodiment of the present invention.

FIG. 3 illustrates a detailed block diagram of a space-time array reception system applied with a systolic array structure for computing the chip-level beamforming weight vector in real-time for a certain channel in accordance with an embodiment of the present invention. The base-band signal going through an array antenna 300 and an RF/IF/ADC unit 310 is multiplied to the weight vector obtained by a snapshot signal received before at a digital beamforming network 320—or space filter—as soon as inputted into the weight vector estimator 330, and then joined in a signal row 390.

Each signal of a path is despread at each finger 361 of the demodulator based on the finely controlled path delay profile information, and those signals are combined at a rake combiner 362. The combined signals are restored while going through the de-interleaver, channel demodulator and data restorer. Pilot channel data and traffic channel data are despread at a finger of the demodulator and used for channel estimation and data demodulation, respectively. The PN code outputted from a PN (Pseudo noise) code generator of the finger 361 feedbacks into the reference signal generator 370 and used for generating reference signals. The reference signal generator 370 synchronizes the PN code transmitted from the finger 361 with the received signal, uses it as a reference signal and transmits it to the weight vector estimator 330. The complex weight vector of a spatial filter 320 is inputted with the output of the reference signal generator 370 and the received signal and renewed in real-time through the procedures of adaptive control employing systolic array structure at the weight vector estimator 330. The number of spatial filters 320 and weight vector estimators 330 is determined by the number of fingers in a demodulator and the complex weight vector of each weight vector estimator 330 is renewed independently. A microprocessor 380 controls the control signal flow and data communication among the blocks.

Figure 4:
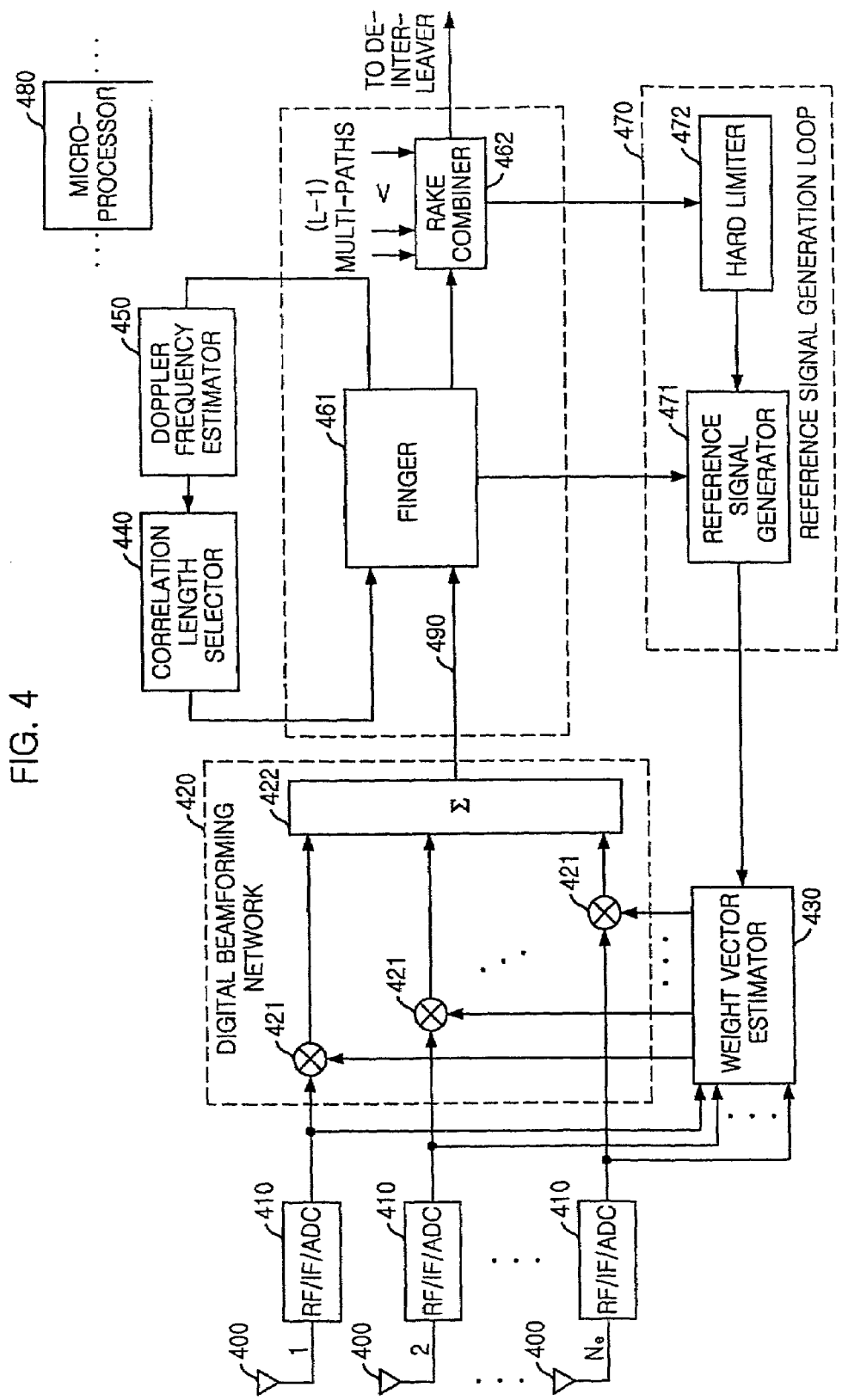
FIG. 4 shows a detailed block diagram of a space-time array reception system applied with a systolic array structure for computing the chip-level DD (Decision-Directed) beamforming weight vector in real-time for a certain channel in accordance with an embodiment of the present invention.

FIG. 4 shows a detailed block diagram of a space-time array reception system applied with a systolic array structure for computing the chip-level DD (Decision-Directed) beamforming weight vector in real-time for a certain channel in accordance with an embodiment of the present invention. FIG. 4 is the same as FIG. 3 just except that they are different in the method generating the reference signal needed for weight vector estimation.

Each signal of a path is despread at each finger of the demodulator based on the finely controlled path delay profile information, and those path signals are combined in the rake combiner 462. The combined signals pass through the de-interleaver, channel demodulator and data restorer and determine a symbol while going through a hard limiter 472. The symbol determined at the hard limiter 472 feedbacks to the reference signal generator 471. Pilot channel data and traffic channel data are despread at a finger 461 of a demodulator and used for channel estimation and data demodulation, respectively, and the PN code outputted from the PN code generator of the finger 461 feedbacks into the reference signal generator 471 and used for the generation of reference signals. The reference signal generator 471 in the reference signal generation loop 470 de-spreads it in the symbol determined at the hard limiter 472 with the PN code transmitted from the finger 461, synchronizes it with the received signal and uses it as a reference signal, and transmits it to the weight vector estimator 430. This method estimating weight vector by using the reference signal obtained through the procedures described above is designated as a decision-directed beamforming algorithm in the present invention.

Figure 5:
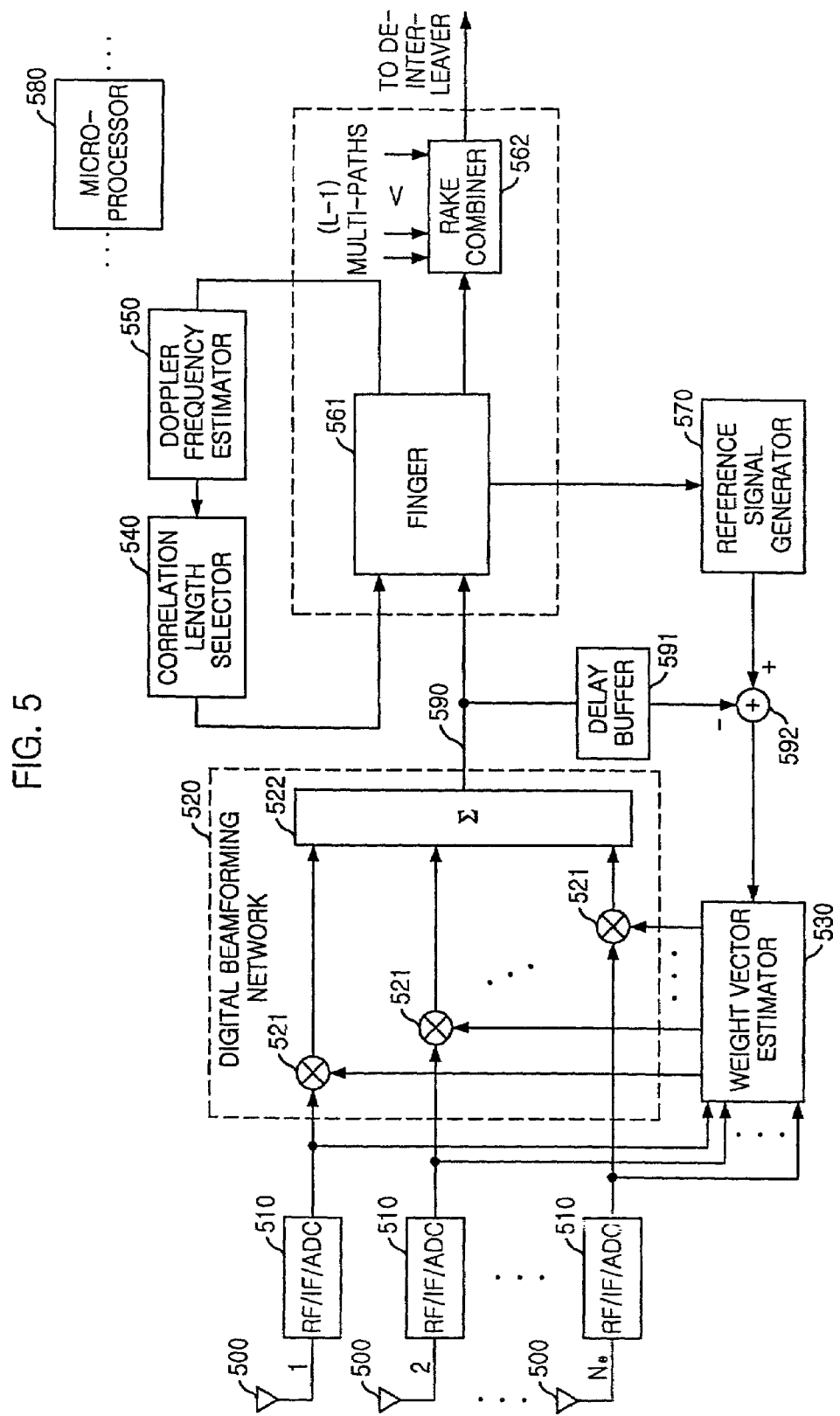
FIG. 5 represents a detailed block diagram of a space-time array reception system applied with a chip-level temporal reference beamforming algorithm for a certain channel in accordance with an embodiment of the present invention.

FIG. 5 represents a detailed block diagram of a space-time array reception system applied with a chip-level temporal reference beamforming algorithm for a certain channel in accordance with an embodiment of the present invention.

The base-band signal having passed through an array antenna 500 and an RF/IF/ADC unit 510 is multiplied to the weight vector obtained by a snapshot signal received before at a digital beamforming network 520 as soon as inputted into the weight vector estimator 530, and then joined in a signal row 590.

Each signal of a path is despread at each finger 561 of the demodulator based on the finely controlled path delay profile information, and those signals are combined at a rake combiner 562. The combined signals are restored while going through the de-interleaver, channel demodulator and data restorer. Pilot channel data and traffic channel data are despread at a finger 561 of the demodulator and used for channel estimation and data demodulation, respectively. The PN code outputted from a PN (Pseudo noise) code generator of the finger 561 feedbacks into the reference signal generator 570 and used for generating reference signals. The reference signal generator 570 synchronizes the PN code transmitted from the finger 561 with the received signal, and uses it as a reference signal.

The complex weight vector of a spatial filter 520 is inputted with the output of the reference signal generator 570 and the difference of the spatial filter 520 outputs stored in the buffer 591 and renewed through the procedures of adaptive control at the weight vector estimator 330. The number of spatial filters 520 and weight vector estimators 530 is determined by the number of fingers 561 in a demodulator and the complex weight vector of each weight vector estimator 530 is renewed independently. A microprocessor 580 controls the control signal flow and data communication among the blocks.

Figure 6:
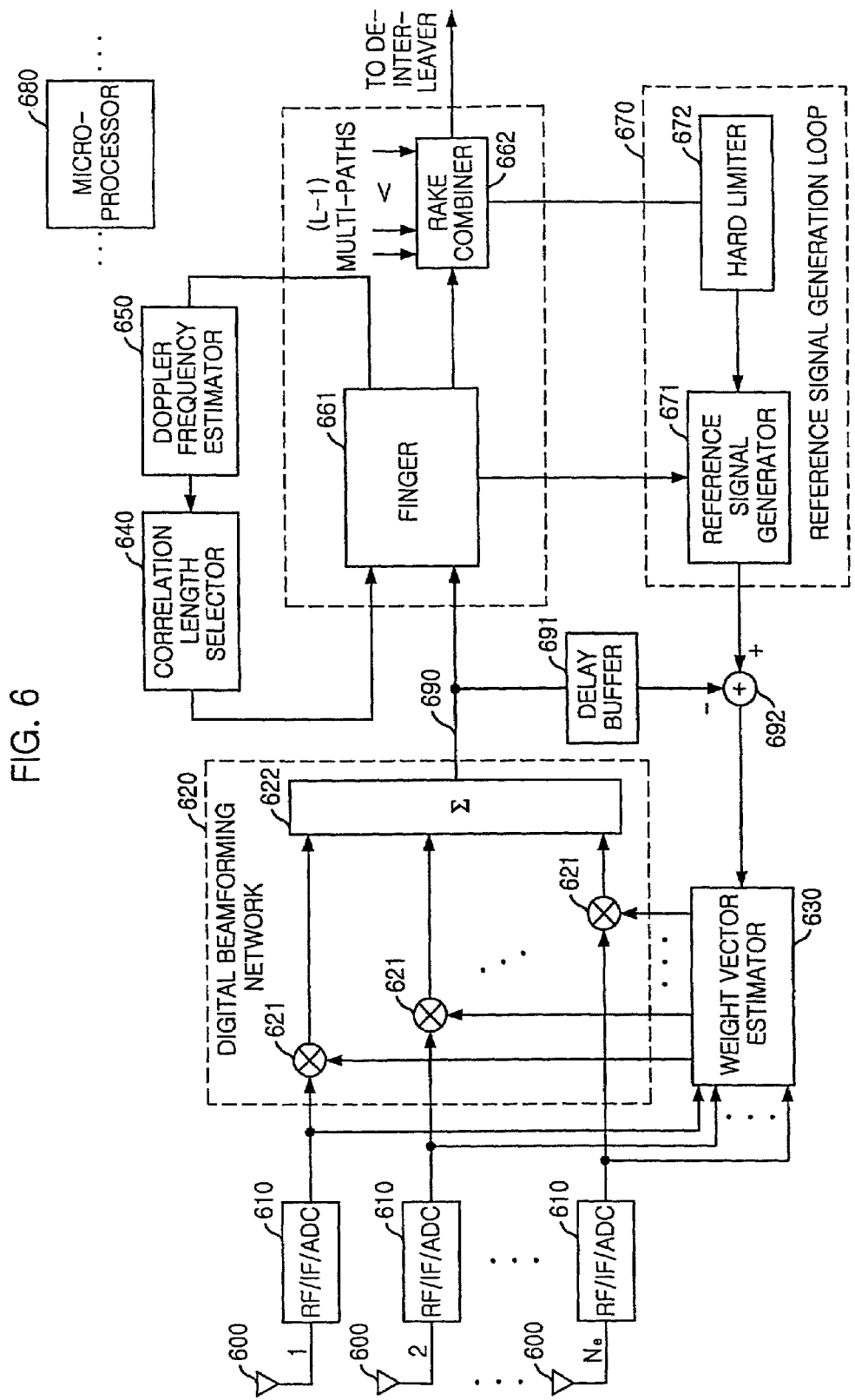
FIG. 6 shows a detailed block diagram of a space-time array reception system applied with a chip-level temporal reference DD (Decision-Directed) beamforming algorithm for a certain channel in accordance with an embodiment of the present invention.

FIG. 6 shows a detailed block diagram of a space-time array reception system applied with a chip-level temporal reference DD (Decision-Directed) beamforming algorithm for a certain channel in accordance with an embodiment of the present invention. FIG. 6 is the same as FIG. 5 just except that they are different in the method generating the reference signal needed for estimating weight vector.

Each signal of a path is despread at each finger 661 of the demodulator based on the finely controlled path delay profile information, and those path signals are combined in the rake combiner 662. The combined signals pass through the de-interleaver, channel demodulator and data restorer and determine a symbol while going through a hard limiter 672. The symbol determined at the hard limiter 672 feedbacks to the reference signal generator 671. Pilot channel data and traffic channel data are despread at a finger 661 of a demodulator and used for channel estimation and data demodulation, respectively, and the PN code outputted from the PN code generator of the finger 661 and the channel estimation information feedback into the reference signal generator 671 and used for the generation of reference signals. The reference signal generator 671 in the reference signal generation loop 670 de-spreads it in the symbol determined at the hard limiter 672 with the PN code transmitted from the finger 661 and the channel estimation information, synchronizes it with the received signal and uses it as a reference signal.

Figure 7:
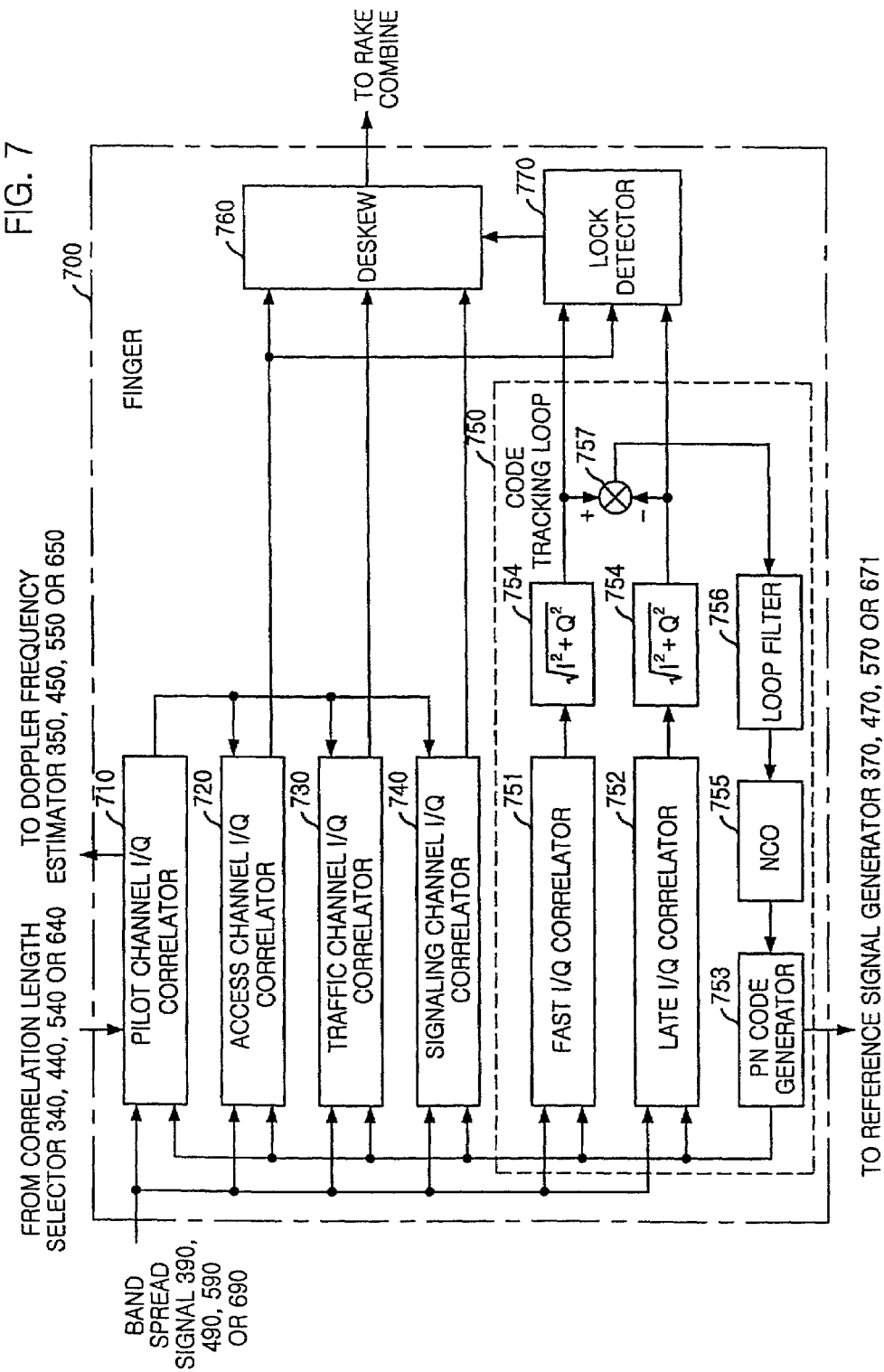
FIG. 7 illustrates a constitutional diagram of a typical finger of a demodulator in a CDMA wireless communication system.

FIG. 7 illustrates a constitutional diagram of a typical finger 361, 461, 561, 661 or 700 of a demodulator in a CDMA wireless communication system. The finger 700 de-spreads the reception bandwidth spread signal 390, 490, 590 or 690 according to each channel, and for processing code tracking loop 750, it comprises an I/Q correlator 710 for detecting pilot channel-or a channel estimator, a traffic channel I/Q correlator 720, an access channel I/Q correlator 730, a signaling channel I/Q correlator 740, a fast-slow I/Q correlator 751, 752, a loop filter 756, an NCO (Numerical Controlled Oscillator 755, and a deskew 760 and a lock detector 770.

The pilot channel I/Q correlator 710 for performing the pilot channel estimation is provided with a correlation length from a correlation length selection unit 340, 440, 540 or 640 obtains channel estimation information by detecting data of the pilot channel from the band-spread signal 390, 490, 590 or 690 inputted thereto. Then, the channel estimation information is provided to a Doppler frequency estimator 350, 450, 550 or 650, a reference signal generator 370, 470, 570 or 671, the traffic channel I/Q correlator 720, the access channel I/Q correlator 730 and the signaling channel I/Q correlator 740. The fast I/Q correlator 751 performs the correlation function at a given integration interval by using a local PN code, which is Tc (chip duration)/2 faster than an on-time PN code, and the late I/Q correlator 752 performs the correlation function at a specific interval by using a local PN code, which is Tc/2 later than the on-time PN code. If the correlation function is completed as long as the correlation length, energies are computed by squaring I and Q data, respectively, and adding the squared I and Q data. The energy is determined for each of a fast path and a late path, and the difference between the computed energies, i.e., difference energy, is provided to the loop filter 756 to be used for obtaining an average of energies determined for each integration interval. The output signal of the loop filter 756 is used for controlling the operation of the NCO 755. The NCO 755 generates a controlled clock in response to a signal value inputted thereto. The clock controls the PN code generator 753. The PN code generator 753 produces a PN code to the reference signal generator 370, 470, 570 or 671.

Figure 8:
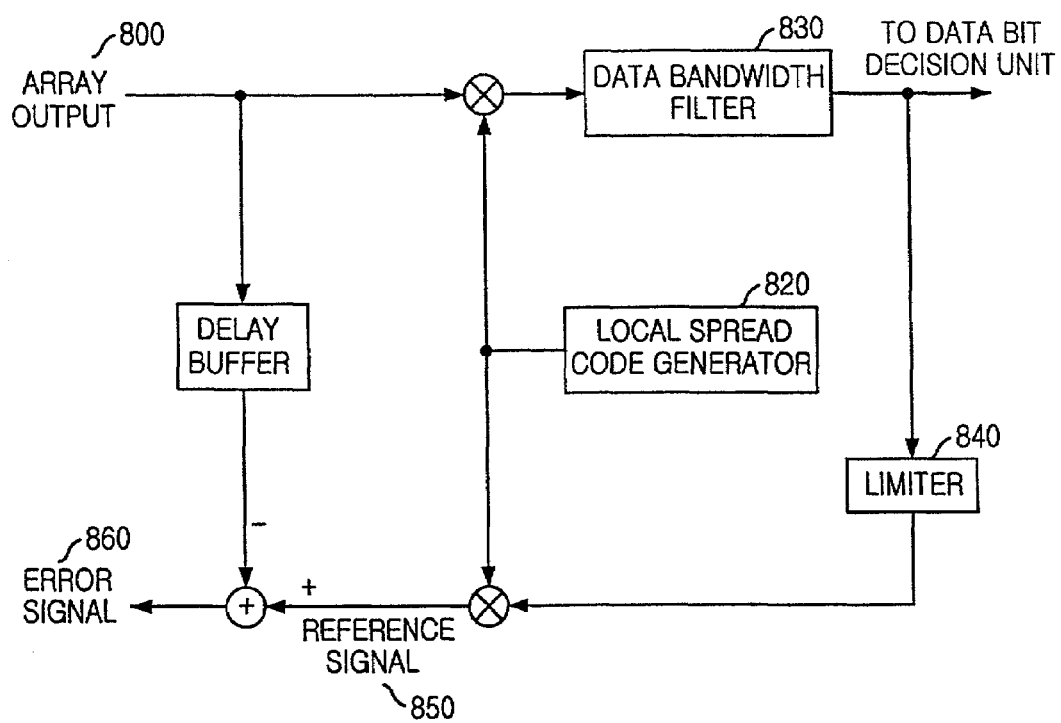
FIG. 8 is a block diagram illustrating a reference signal generation loop of Compton well known in a bandwidth spread adaptive array system.

FIG. 8 is a block diagram illustrating a reference signal generation loop of Compton well known in a bandwidth spread adaptive array system.

In the configuration shown in the drawing, beamforming is performed prior to demodulation. That is to say, an array output signal 800 is multiplied by a band-spread code that is generated at a local despread code generator 860, thereby being despread. The despread signal passes through a data bandwidth filter 850 and a limiter 870. The despread signal that passes through the limiter 870 is multiplied by the band-spread code that is generated at the local spread code generator 860, thereby being respread.

A reference signal generated by the re-spreading is compared with the array output signal stored in a delay buffer 810 to thereby produce an error signal. The error signal is provided in an adaptive control process so as to update a weight vector for producing a beam. The present invention provides a demodulator in the CDMA wireless communication system that can be embodied by using a conventional demodulator, based on the reference signal generation loop of Compton. However, the generation of the reference signal is performed by feedbacking respective output signals of the pilot channel I/Q correlator 710, the local PN code generator 753 and the rake combiner 362, 462, 562 or 662 in accordance with the present invention.

Adaptive beamforming algorithms such as a minimum mean square error (MMSE), a least mean square (LMS), a recursive least square (RLS) or the like are applicable to a CDMA smart base station system of a space-time array receive structure, wherein the base station system is based on the chip-level beamforming method. A method of an adaptive beamforming process will be described hereinafter.

The present invention is applicable to almost all types of data and spread demodulation methods. First, described will be an exemplary case where a signal is spread-modulated and transmitted in binary phase shift keying/quadrature phase shift keying (BPSK/QPSK) modulation process, and received at a j-th antenna, wherein the signal is represented by a following equation 1 at the time of reception.

$$y_{k,l}^{(j)}(t) = \sum_{k=1}^{K}\sum_{l=1}^{L_k} \xi_{k,l}^{(j)}(t)[A_p W_0(t) + W_1(t)s_k(t-\tau_{k,l}^{(j)})]c_k(t-\tau_{k,l}^{(j)}) + n(t),$$ EQ. 1 where $A_p$, $W_0(t)$ and $W_1(t)$ denote the size of a pilot channel, a walsh code for a pilot channel and a walsh code for data, respectively; $s_k(t)$, $c_{I,K}(t)$, $c_{Q,K}(t)$, $\xi_{k,l}^{(j)}(t)$ and $\tau_{k,l}^{(j)}$ denote a binary data symbol of k-th user's, a spread code for an I channel of k-th user's, a spread code for a Q channel of k-th user's, a complex fading envelope corresponding to an l-th path of k-th user's in a j-th antenna and a propagation delay corresponding to an l-th path of k-th user's in a j-th antenna, respectively; and n(t), K and $L_k$ denote a noise component, the total number of users and the number of multi-paths for each user, respectively.

An output signal of the space filter in the digital beamforming network is represented by a following equation 2, wherein the output signal is generated a combined signal by summing multiplied signals together that are acquired by multiplying received signals and weight vectors.

$$z_{k,l}(m) = \sum_{j=1}^{N_e} y_{k,l}^{(j)}(m) w_{k,l}^{(j)*}(m),$$ EQ. 2 where Ne denotes the number of antennas.

A beamforming weight for an (m+1)-th signal in the j-th antenna is calculated in the weight estimator by using adaptive beamforming algorithms such as MMSE, RLS, LMS or the like. Generally, a reference signal is required for an adaptive optimization process of the adaptive beamforming algorithm.

Figure 9:
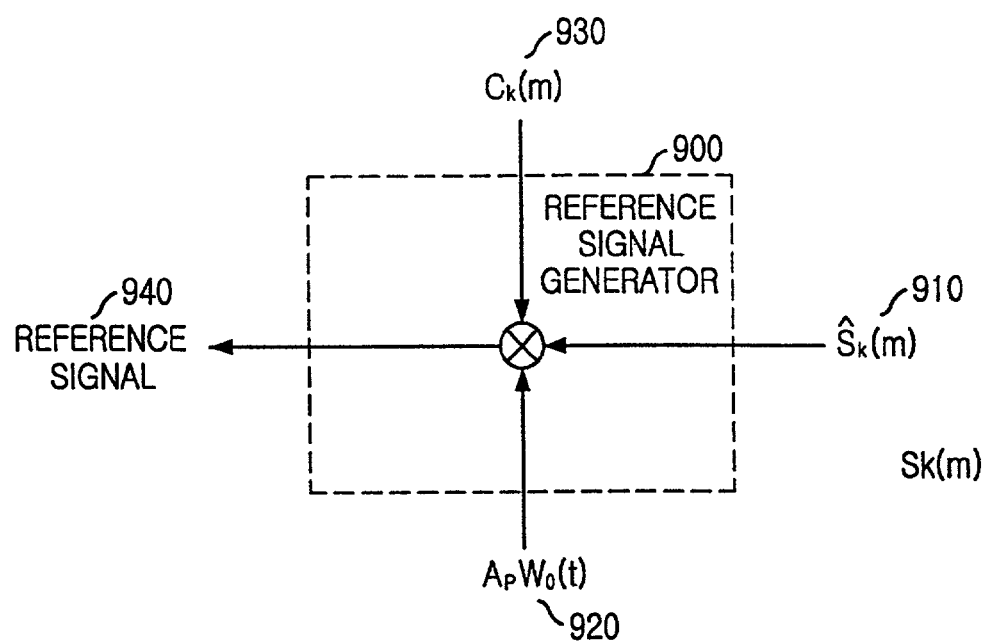
FIG. 9 is a block diagram showing a reference signal generator of FIGS. 1 and 2.

FIG. 9 is a block diagram illustrating a reference signal generating process in a space-time array receive system in accordance with one embodiment of the present invention.

Referring to FIG. 9, a reference signal generator 900 is provided with a symbol ($\hat{S}_k(m)$) 910 which is generated by performing a hard-decision for an output of the rake combiner, a pilot channel symbol sequence ($A_p$ $W_0(t)$) 920 and an output of the PN code generator ($c_k(m)$) 930, at the same time, thereby generating a reference signal ($\hat{r}_k(m)$) 940 by despreading as a signal similar to a signal generated at the mobile station.

Figure 10:
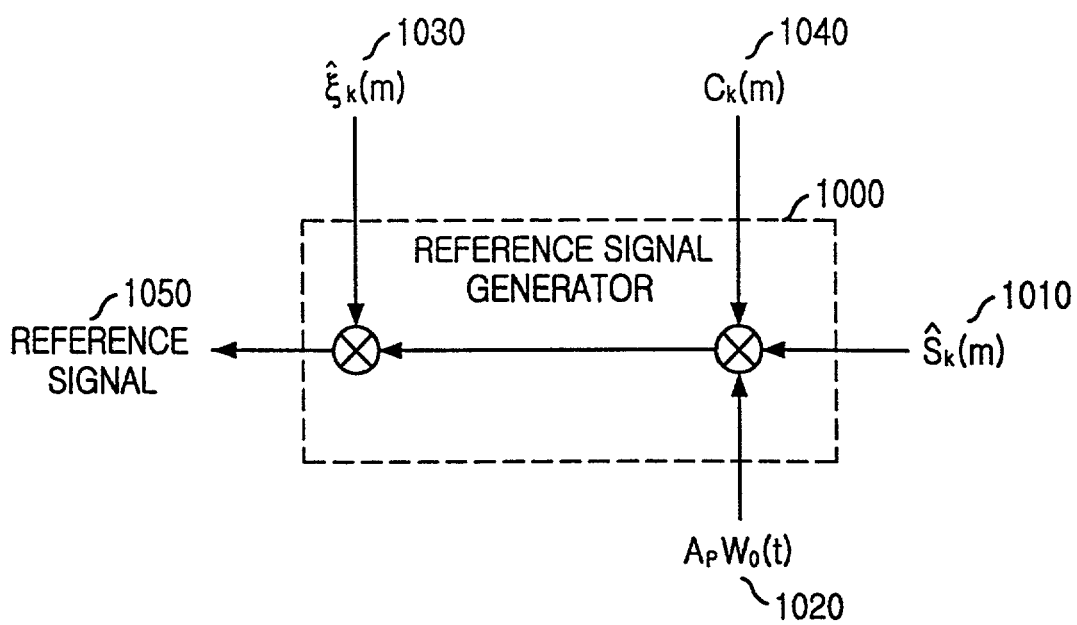
FIG. 10 represents a block diagram showing a reference signal generator of FIGS. 3 and 4.

FIG. 10 is a block diagram illustrating a reference signal generating process in a space-time array receive system in accordance with another embodiment of the present invention.

Referring to FIG. 10, a reference signal generator 1000 is provided with a symbol ($\hat{s}_k(m)$) 1010 which is generated by performing a hard-decision for an output of the rake combiner, a pilot channel symbol sequence ($A_p$ $W_0(t)$) 1020, an output of the channel estimator ($\hat{\xi}_{k,l}(m)$) 1030 and an output of the PN code generator ($c_k(m)$) 1040 at the same time, thereby generating a reference signal ($\hat{r}_k(m)$) 1050 by despreading as a signal similar to a signal generated at the mobile station.

Based on the reference signal generating processes in FIGS. 9 and 10, the reference signal can be generated by following three types of methods depending on how the reference signal is generated.

According to a first type of method, the reference signal is generated by using a pilot symbol sequence and a spread code, represented as a following equation 3.

$$\hat{r}_k(m) = A_p W_0(m) c_k(m)$$ EQ. 3

According to a second type of method, the reference signal is generated by using a feedback traffic channel estimation symbol sequence, spread and walsh codes, represented as a following equation 4.

$$\hat{r}_k(m) = W_1(m)\hat{s}_k(m)c_k(m)$$ EQ. 4

According to a third type of method, the reference signal is generated by using a pilot symbol sequence, a feedback traffic channel estimation symbol sequence, spread and walsh codes, represented as a following equation 5.

$$\hat{r}_k(m) = [A_p W_0(m) + W_1(m)\hat{s}_k(m)]c_k(m)$$ EQ. 5

The above all three types of methods are applicable to adaptive beamforming algorithms such as the minimum mean square error (MMSE), the recursive least square (RLS), the least mean square (LMS), a normalized least mean square (NLMS) or the like. However, in case of the LMS and the NLMS, an error signal is used for an adaptive process for updating a beamforming coefficient, different from the other algorithms. The error signal is represented as a following equation 6 and is calculated as a difference between an output signal of the digital beamforming network that is stored in the buffer and an output signal of the reference signal generator.

$$e_{k,l}(m) = \bar{r}_k(m) - z_{k,l}(m),$$ EQ. 6 where $\bar{r}_k(m)$ as the reference signal represents $\hat{r}_{k,l}(m) \cdot \hat{\xi}_{k,l}(m)$ and $\hat{\xi}_{k,l}(m)$ denotes a channel estimation value.

Figure 11:
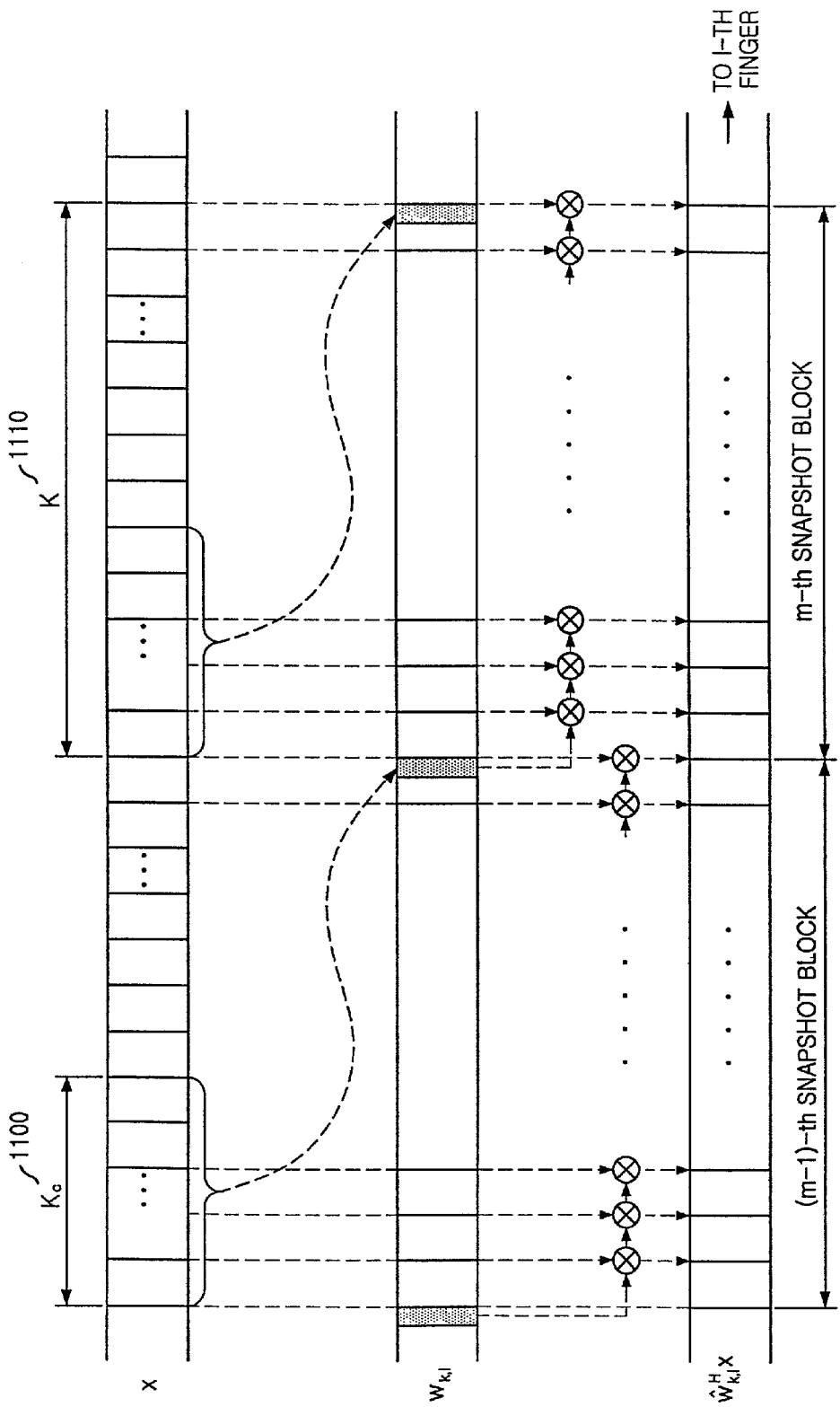
FIG. 11 is a constitutional diagram depicting the method of updating weight vector in consideration of an actual embodiment of hardware.

As shown in FIG. 11, updating the weight vector for each chip in updating a weight vector causes too much calculation to be applicable to a real system. Accordingly, in order to update the weight vector, chip level signals are stored in the buffer during a $K_c$ interval 1100 denoting a specific snapshot block length and the estimation value is made updated during a K symbol interval denoting a specific interval updating the weight vector. After then, a real time calculation is possible by employing a method applying the weight vector to an interval updating a next weight vector. Herein, the value of the $K_c$ is adjustable depending on a calculation capacity for calculating an estimation value of the beamforming weight vector. As the value of the $K_c$ is increased, the improvement of performance is accomplished where the length of K is in the range of $K_c < K$.

Figure 12:
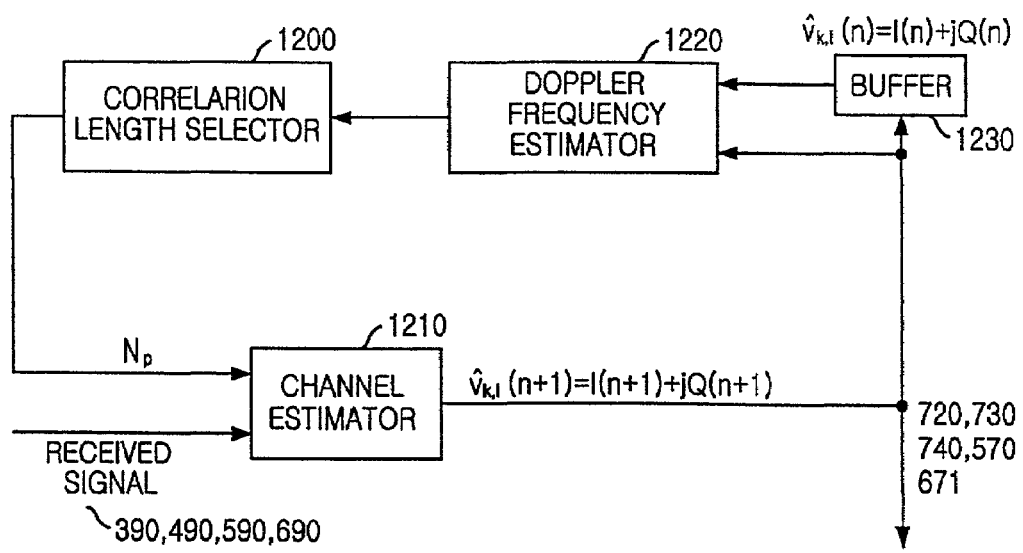
FIG. 12 is a block diagram showing a correlation length selection portion of a channel estimator and a Doppler frequency estimator of a fading channel.

FIG. 12 is a block diagram illustrating a process of estimating a Doppler frequency and a correlation length in accordance with the present invention.

A Doppler frequency estimation unit 1220 estimates a Doppler frequency of a fading channel based on previous fading channel information and present fading channel information inputted thereto. Hereinafter, in more detail described will be a method for estimating a Doppler frequency in accordance with the present invention.

When $\hat{v}_{k,l}(n)$ and $\hat{v}_{k,l}(n+1)$ which are, respectively, n-th and (n+1)-th channel estimation values of the channel estimator 1210 are represented by using a following equation 7, an instantaneous frequency difference corresponding to a Doppler frequency of the fading channel is obtained by using following equations 8 to 10.

$$\hat{v}_{k,l}(n) = I(n) + jQ(n)$$

$$\hat{v}_{k,l}(n+1) = I(n+1) + jQ(n+1),$$ EQ. 7 where I(n), Q(n), I(n+1) and Q(n+1) denote $\hat{\alpha}_n \cos \hat{\theta}_n$, $\hat{\alpha}_n \sin \hat{\theta}_n$, $\hat{\alpha}_{n+1} \cos \hat{\theta}_{n+1}$ and $\hat{\alpha}_{n+1} \sin \hat{\theta}_{n+1}$, respectively, and $\alpha$ and $\theta$ denote the size and the phase of the fading channel, respectively.

Referring to the EQ. 7, a multiplication of I(n) of the n-th channel estimation value and Q(n+1) of the (n+1)-th channel estimation value, and a multiplication of Q(n) of the n-th channel estimation value and I(n+1) of the (n+1)-th channel estimation value result in a following equation 8.

$$I(n)Q(n+1) = \hat{\alpha}_n \sin \hat{\theta}_{n+1} \cdot \hat{\alpha}_n \cos \hat{\theta}_n$$

$$I(n+1)Q(n) = \hat{\alpha}_n \cos \hat{\theta}_{n+1} \cdot \hat{\alpha}_n \sin \hat{\theta}_n \quad \text{EQ. 8}$$

$$I(n)Q(n+1) - I(n+1)Q(n) = \hat{\alpha}_n^2 (\sin \hat{\theta}_{n+1} \cos \hat{\theta}_n - \cos \hat{\theta}_{n+1} \sin \hat{\theta}_n)$$

$$= \hat{\alpha}_n^2 \sin(\hat{\theta}_{n+1} - \hat{\theta}_n)$$

$$\approx \hat{\alpha}_n^2 (\hat{\theta}_{n+1} - \hat{\theta}_n),$$

where $\hat{\alpha}_n^2$ denotes $I^2(n) + Q^2(n)$. And the instantaneous frequency difference to be sought can be obtained by using an following equation 10.

$$\Delta \hat{\omega} = \frac{I(n)Q(n+1) - I(n+1)Q(n)}{[I^2(n) + Q^2(n)] \cdot \Delta t} \quad \text{EQ. 10}$$

By using a Doppler frequency obtained from the equation 10, a correlation length selection unit 1200 calculates an average of correlation lengths selected in the past and a correlation length selected in the present to thereby determine a correlation length ($N_p$) of the channel estimator 1210 adaptively as represented in a following equation 11.

$$N_P(n) = \frac{N_P(n) + N_P(n-1) + \ldots + N_P(n-N+1)}{N} \quad \text{EQ. 11}$$

Figure 13:
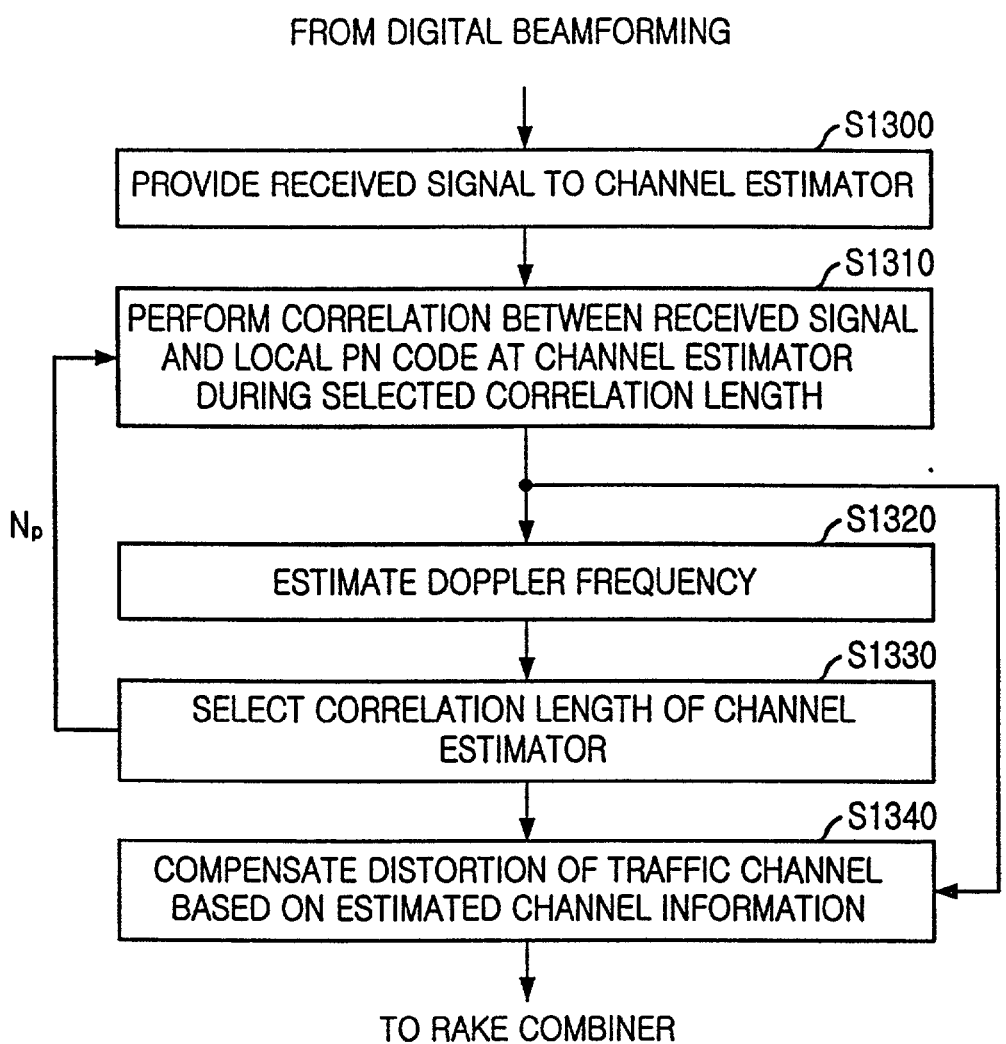
FIG. 13 illustrates a signal flow chart of the correlation length selection portion of the channel estimator and the Doppler frequency estimator of the fading channel.

FIG. 13 illustrates a signal flow chart of the correlation length selection portion of the channel estimator and the Doppler frequency estimator of the fading channel. First, a received signal is inputted from the digital bemforming network to the channel estimator, at the step S1300.

A correlation function is performed between the inputted signal and a local PN code during a correlation length selected in the past, at the step S1310.

At the step S1320, a Doppler frequency is estimated.

At the step S1330, a correlation length of the channel estimator is selected and the correlation length selected in the past is updated. Then, the logic flow returns to the step S1310.

At the step S1340, a distortion of a traffic channel is compensated based on channel information that is estimated after performing the step S1310.

As described above, in accordance with the present invention, it is possible to adaptively compensate the distortion effect caused by the fading channel by estimating the Doppler frequency of the estimated fading channel and the correlation length of the pilot channel correlator through the use of the Doppler frequency estimator and correlation length of the correlation length selector in the finger. Further, by applying the space-time array receive system employing the finger for adaptively compensating the distortion effect in a signal environment of co-channel interference and multi-path fading, it is possible to enhance power effectiveness due to optimum oriented beam construction and to reduce unnecessary interference.

While the present invention has been described with respect to the particular embodiments, it will be apparent to those skilled in the art that various changes and modifications may be made without departing from the spirit and scope of the invention as defined in the following claims.

What is claimed is:

1. A space-time array receiving system to which a chip-level temporal reference beamforming algorithm is applied, the system comprising:

a plurality of digital beamforming networks for forming beams of signals received through a plurality of antennas by spatial-filtering the signals, to thereby generate spatial-filtered signals;

a plurality of demodulating means for demodulating the spatial-filtered signals to generate demodulated signals;

correlating means located in each of the plurality of demodulating means, for estimating a fading channel signal based on pilot channel signals;

Doppler frequency estimating means for estimating Doppler frequency of the fading channel signal to generate Doppler frequency estimated values;

correlation length selection means for selecting a correlation length of the pilot channel signals based on the Doppler frequency estimated values and based on a mean value of the correlation length previously selected and the correlation length currently selected;

a plurality of reference signal generation means for generating reference signals based on output signals from the correlating means; and a plurality of weight vector estimating means for generating weight vectors based on the reference signals and the signals received and for providing the weight vectors to the digital beamforming networks.

2. The system as recited in claim 1, wherein the weight vectors are estimated based on a minimum mean square error (MMSE) algorithm and a recursive least square (RLS) algorithm.

3. The system as recited in claim 1, wherein the Doppler frequency is estimated based on previous fading channel information stored on buffers and current fading channel information from the Doppler frequency estimating means.

4. The system as recited in claim 1, wherein the reference signal is generated based on a Compton's reference signal generation loop model.

5. The system as recited in claim 1, wherein the digital beamforming networks form the beams of the signals by a chip level, each of the signals being down-sampled for each multi-path signals at a chip rate, and wherein the reference signal is generated by the chip rate.

6. The system as recited in claim 1, wherein the weight vector estimating means stores chip level signals having a predetermined snap shot block length Kc, updates the weight vectors for a predetermined weight vector update time K and applies the updated weight vector to the signals received for a next weight vector update time, and wherein the predetermined snap shot block length is selected between the predetermined snap shot block length Kc and the predetermined weight vector update time K in accordance with signal processing capability.

7. A space-time array receiving system to which a chip-level temporal reference beamforming algorithm is applied, the system comprising:
- a plurality of digital beamforming networks for forming beams of signals received through a plurality of antennas by spatial-filtering the signals, to thereby generate spatial-filtered signals;
- a plurality of demodulating means for demodulating the spatial-filtered signals to generate demodulated signals;
- correlating means located in each of the plurality of demodulating means, for estimating a fading channel signal based on pilot channel signals;
- Doppler frequency estimating means for estimating Doppler frequency of the fading channel signal to generate Doppler frequency estimated values;
- correlation length selection means for selecting a correlation length of the pilot channel signals based on the Doppler frequency estimated values;
- a rake combining means for combining symbols from the correlating means to thereby generate a rake combined signal;
- a hard limiter for determining a signature of the rake combined symbol;
- a plurality of reference signal generation means for generating reference signals based on output signals from the correlating means and the hard limiter and based on a Compton's reference signal generation loop model; and
- a plurality of weight vector estimating means for generating weight vectors based on the reference signals and the signals received and for providing the weight vectors to the digital beamforming networks.

8. The system as recited in claim 7, wherein the weight vectors are estimated based on a minimum mean square error decision directed (MMSE-DD) algorithm and a recursive least square decision directed (RLS-DD) algorithm.

9. The system as recited in claim 7, wherein the Doppler frequency is estimated based on previous fading channel information stored on buffers and current fading channel information from the Doppler frequency estimating means.

10. The system as recited in claim 7, wherein the correlation length is selected based on a mean value of the correlation length previously selected and the correlation length currently selected.

11. The system as recited in claim 7, wherein the reference signal generators re-spread estimated symbol sequences from the hard limiter, spreading codes and channel estimation information and pilot channel symbol sequences, to thereby generate a re-spread signal which is used as a reference signal.

12. The system as recited in claim 7, wherein the digital beamforming networks form the beams of the signals by a chip level, each of the signals being down-sampled for each multi-path signals at a chip rate, and wherein the reference signal is generated by the chip rate.

13. The system as recited in claim 7, wherein the weight vector estimating means stores chip-level signals having a predetermined snap shot block length Kc, updates the weight vectors for a predetermined weight vector update time K and applies the updated weight vector to the signals for a next weight vector update time, and wherein the predetermined snap shot block length is selected between the predetermined snap shot block length Kc and the predetermined weight vector update time K in accordance with signal processing capability.

14. A space-time array receiving system to which a chip-level temporal reference beamforming algorithm is applied, the system comprising:
- a plurality of digital beamforming networks for forming beams of signals received through a plurality of antennas by spatial-filtering the signals, to thereby generate spatial-filtered signals;
- a plurality of demodulating means for demodulating the spatial-filtered signals to generate demodulated signals;
- correlating means located in each of the plurality of demodulating means, for estimating a fading channel signal based on pilot channel signals;
- Doppler frequency estimating means for estimating Doppler frequency of the fading channel signal to generate Doppler frequency estimated values; correlation length selection means for selecting a correlation length of the pilot channel signals based on the Doppler frequency estimated values;
- a plurality of reference signal generation means for generating reference signals based on output signals from the correlating means;
- a plurality of subtracters for generating difference signals between the spatial-filtered signals and the reference signals; and
- a plurality of weight vector estimating means for estimating weight vectors based on the difference signals and the signals received, and providing the weight vectors to the digital beamforming networks.

15. The system as recited in claim 14, wherein the weight vectors are estimated based on a least mean square (LMS) algorithm and a normalized LMS (NLMS) algorithm.

16. The system as recited in claim 14, wherein the Doppler frequency is estimated based on previous fading channel information stored on buffers and current fading channel information from the Doppler frequency estimating means.

17. The system as recited in claim 14, wherein the correlation length is selected based on a mean value of the correlation length previously selected and the correlation length currently selected.

18. The system as recited in claim 14, wherein the reference signal is generated based on a Compton's reference signal generation loop model.

19. The system as recited in claim 14, wherein the digital beamforming networks form the beams of the signals by a chip level, each of the signals being down-sampled for each multi-path signals at a chip rate, and wherein the reference signal is generated by the chip rate.

20. The system as recited in claim 14, wherein the weight vector estimating means stores chip level signals having a predetermined snap shot block length Kc, updates the weight vectors for a predetermined weight vector update time K and applies the updated weight vector to the signals for a next weight vector update time, and wherein the predetermined snap shot block length is selected between the predetermined snap shot block length Kc and the predetermined weight vector update time K in accordance with signal processing capability.

21. A space-time array receiving system to which a chip-level temporal reference beamforming algorithm is applied, the system comprising:
- a plurality of digital beamforming networks for forming beams of signals received through a plurality of antennas by spatial-filtering the signals, to thereby generate spatial-filtered signals;
- a plurality of demodulating means for demodulating the spatial-filtered signals to generate demodulated signals;

correlating means located in each of the plurality of demodulating means, for estimating a fading channel signal based on pilot channel signals;

Doppler frequency estimating means for estimating Doppler frequency of the fading channel signal to generate Doppler frequency estimated values;

correlation length selection means for selecting a correlation length of the pilot channel signals based on the Doppler frequency estimated values;

a rake combining means for combining symbols from the correlating means to thereby generate a rake combined signal;

a hard limiter for determining a signature of the rake combined symbol;

a plurality of reference signal generation means for generating reference signals based on output signals from the correlating means and the hard limiter;

a plurality of subtracters for generating difference signal between the spatial-filtered signals and the reference signals; and a plurality of weight vector estimating means for estimating weight vectors based on the difference signals and the signals received, and providing the weight vectors to the digital beamforming networks.

22. The system as recited in claim 21, wherein the weight vectors are estimated based on a least mean square decision directed (LMS-DD) algorithm and a normalized LMS decision directed (NLMS-DD) algorithm.

23. The system as recited in claim 21, wherein the Doppler frequency is estimated based on previous fading channel information stored on buffers and current fading channel information from the Doppler frequency estimating means.

24. The system as recited in claim 22, wherein the correlation length is selected based on a mean value of the correlation length previously selected and the correlation length currently selected.

25. The system as recited in claim 22, wherein the reference signal is generated based on a Compton's reference signal generation loop model.

26. The system as recited in claim 22, wherein the reference signal generators re-spread estimated symbol sequences from the hard limiter, spreading codes and channel estimation information and pilot channel symbol sequences, to thereby generate a re-spread signal which is used as a reference signal.

27. The system as recited in claim 22, wherein the digital beamforming networks form the beams of the signals by a chip level, each of the signals being down-sampled for each multi-path signals at a chip rate, and wherein the reference signal is generated by the chip rate.

28. The system as recited in claim 22, wherein the weight vector estimating means stores chip level signals havng a predetermined snap shot block length Kc, updates the weight vectors for a predetermined weight vector update time K and applies the updated weight vector to the signals for a next weight vector update time, and wherein the predetermined snap shot block length is selected between the predetermined snap shot block length Kc and the predetermined weight vector update time K in accordance with signal processing capability.

29. A space-time array receiving method to which a chip-level temporal reference beamforming algorithm is applied, the method comprising the steps of:

a) at a plurality of digital beamforming networks, forming beams of signals received through a plurality of antennas by spatial-filtering the signals, to thereby generate spatial-filtered signals;

b) demodulating the spatial-filtered signals to generate demodulated signals;

c) estimating a fading channel signal based on pilot channel signals;

d) estimating Doppler frequency of the fading channel signal to generate Doppler frequency estimated values, wherein the Doppler frequency is estimated based on previous fading channel information and current fading channel information;

e) selecting a correlation length of the pilot channel signals based on the Doppler frequency estimated values;

f) generating reference signals based on output signals from the correlating means; and g) generating weight vectors based on the reference signals and the signals received, and providing the weight vectors to the digital beamforming networks.

30. The method as recited in claim 29, wherein the weight vectors are estimated based on a minimum mean square error (MMSE) algorithm and a recursive least square algorithm.

31. The system as recited in claim 29, wherein the correlation length is selected based on a mean value of the correlation length previously selected and the correlation length currently selected.

32. The system as recited in claim 29, wherein the reference signal is generated based on a Compton's reference signal generation loop model.

33. A computer readable recording medium storing instructions for executing a space-time array receiving method to which a chip-level temporal reference beamforming algorithm is applied, the method comprising the steps of:

a) at a plurality of digital beamforming networks, forming beams of signals received through a plurality of antennas by spatial-filtering the signals, to thereby generate spatial-filtered signals;

b) demodulating the spatial-filtered signals to generate demodulated signals;

c) estimating a fading channel signal based on pilot channel signals;

d) estimating Doppler frequency of the fading channel signal to generate Doppler frequency estimated values;

e) selecting a correlation length of the pilot channel signals based on the Doppler frequency estimated values;

f) generating reference signals based on output signals from the correlating means and based on a Compton's reference signal generation loop model; and g) generating weight vectors based on the reference signals and the signals received, and providing the weight vectors to the digital beamforming networks.

* * * * *